T. BRENNAN, Jr.
DISK FURROW OPENER.
APPLICATION FILED FEB. 23, 1915.
1,149,992.
Patented Aug. 10, 1915.
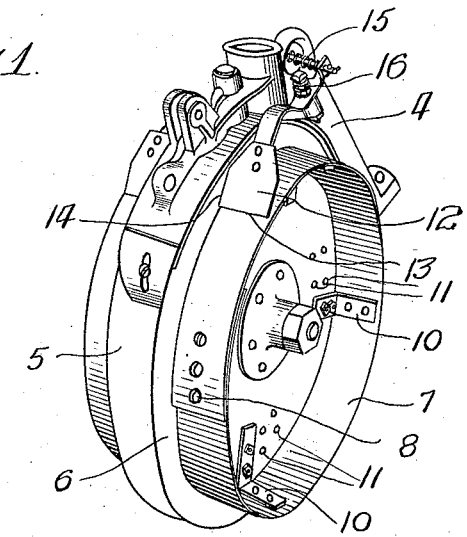
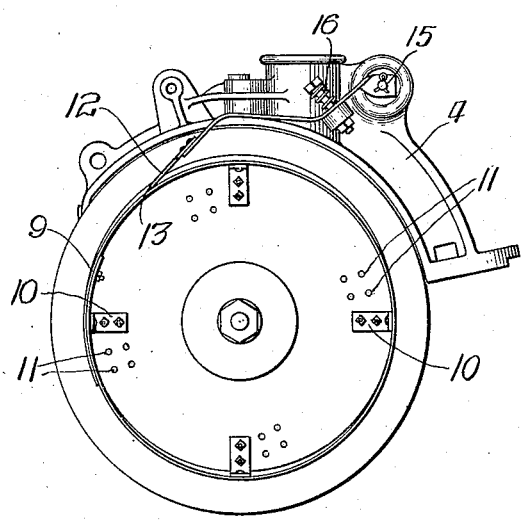
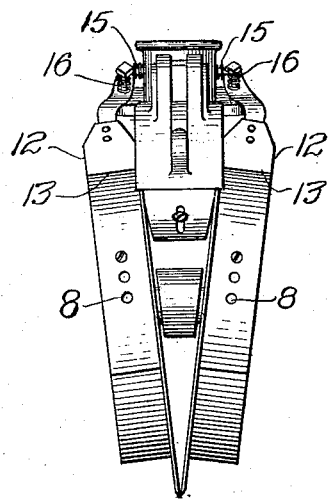
Witnesses:
Y. C. Higham
Frances M. Frost
Inventor
Thomas Brennan Jr
by Baum & Baum
Attys.

UNITED STATES PATENT OFFICE.

THOMAS BRENNAN, JR., OF MOLINE, ILLINOIS, ASSIGNOR TO MONITOR DRILL COMPANY, OF MINNEAPOLIS, MINNESOTA, A CORPORATION OF MINNESOTA.

DISK FURROW-OPENER.

1,149,992.  Specification of Letters Patent.  Patented Aug. 10, 1915.

Application filed February 23, 1915. Serial No. 10,001.

*To all whom it may concern:*

Be it known that I, THOMAS BRENNAN, Jr., a citizen of the United States, residing at Moline, in the county of Rock Island and State of Illinois, have invented certain new and useful Improvements in Disk Furrow-Openers, of which the following is a specification.

The present invention has to do with improvements in disk furrow openers, and has particular reference to a construction whereby the depth of the disks in the soil is perfectly regulated.

In addition to this, the invention has also reference to other features which will appear from a detailed study of the specification.

It has heretofore been customary in disk furrow openers or seeding machines to provide an attachment at the rear of each furrow opener which rides along on the ground and causes the furrow opener to rise or fall with respect to the implement frame. In this way, it has been attempted to individually control each furrow opener so as to cause the same to travel at the proper depth in the soil. This arrangement is open to the objection that the depth of the furrow opener is not controlled or regulated by the surface of the soil at the point where the furrow opener is operating, but is regulated rather by the surface of the soil at some other point. Consequently, the inequalities of the soil are not properly transmitted to the furrow opener, with a result that the latter does not ride at a uniform depth.

One of the main objects of the present invention is to provide a construction such that the depth of the furrow opener will at all times be regulated or controlled by the surface of the soil at the exact point where the disks are cutting.

Another objection to the present forms of disk attachment is that the traction developed for rotating the disks is solely dependent upon the surface of the disk in contact with the soil, and this surface in turn is dependent upon the depth at which the disk is riding in the soil. Secondly, if the implement be set to open a shallow furrow, it may not develop sufficient traction to rotate the disks, and this is particularly true in the case of light or soft soil. The farmer frequently sets his disk to travel at a greater depth than desired, simply for the purpose of developing sufficient traction.

Another object of the invention is to overcome the foregoing objection by so constructing the implement that the necessary traction will be secured without the necessity of setting the disks at an additional depth in the soil. This result is obtained by bringing more working surface into contact with the soil than merely the face of the disk itself. In this connection, another object is to provide an implement such that the soil will be automatically and regularly tamped at both sides of the furrow, the tamping action being perfectly uniform and of proper amount at all times.

Another feature of the invention has reference to the provision of scrapers of such construction that they will clean not only the side faces of the disks, but also the surfaces of the depth regulating bands, thus keeping all working parts clean at all times.

Other objects and uses will appear from a detailed description of the invention which consists in the features of construction and combinations of parts hereinafter described and claimed.

Referring to the drawings: Figure 1 shows a perspective elevation of a double disk attachment having applied thereto the depth regulating means to which the present invention particularly relates; Fig. 2 is a side elevation corresponding to Fig. 1; and Fig. 3 is a rear elevation corresponding to Fig. 1.

In the several figures the frame of the implement is designated by the numeral 4 and the disks are designated by the numerals 5 and 6. These disks may be carried by the frame in any desired manner, and, therefore, I will not here concern myself particularly with the manner in which the disks are mounted.

In the particular embodiment of the invention illustrated in the drawing, I place a band or metal strip 7 on the outside face of each disk. This band constitutes in effect a circular tread which is adapted to ride upon the surface of the furrow at the side of the furrow, thereby regulating the depth at which the disk will travel, tamping the soil at the side of the furrow, and developing additional traction for the rotation of the disk. As is shown in the drawing, I may mount one of these depth regulating bands on each of the disks of a double disk implement, but it will be evident, as far as the feature of depth regulating is concerned, it would suffice to mount a band on only one of the disks.

In order to change the adjustment of the implement, a different size of depth regulating band may be used, having either a greater or lesser diameter as desired. However, in the arrangement illustrated, I have shown each band as provided with a plurality of perforations 8 in each end, which are adapted to receive a screw or the like 9. This screw may be set into the different holes, thereby drawing up or letting out the band in order to regulate its diameter. At the same time I have shown the band as connected to the disk by means of angles 10. These angles may be connected to the disk by bolts setting into the holes 11, which holes are so positioned that as the band is increased or diminished in diameter according to the successive sets of the holes 8, the angles 10 will come into register with different sets of holes 11.

I have illustrated the scraper 12 as having its edge 13 riding on the surface of the band and its edge 14 riding against the face of the disk. The spring 15 serves to maintain the scrapers against the disks and the springs 16 maintain the scrapers against the bands. It thus appears that each scraper cleans both the disk and the bands.

By setting the bands so that their overlapping ends lie to the rear as the bands rotate, the scrapers will not lock against the outside ends of the overlapping portions of the bands.

Although, in the particular construction illustrated, the circular band is directly attached to the disk, still it will be understood that, in order to secure the advantages and benefits of the features of invention herein disclosed, it is only necessary that the band should bear a fixed relationship to the disk during the operation of the latter. Therefore, any arrangement in which the band bears a fixed relationship to the disk is within the scope of my invention, and where in the claims I speak of the combination with a disk, of a circular band, or circular portion, or where I use similar terminology, it will be understood that I include any construction in which the band is mounted to bear a concentric relationship with respect to the disk.

I claim:

1. In a disk implement, the combination with a disk, of a circular shouldered portion projecting from the outside face of the same and of lesser diameter than the cutting edge of the disk, and a scraper having its edge portion seated against the shoulder and its side portion seated against the projecting periphery of the disk.

2. In a disk implement, the combination with a disk, of a circular shouldered portion projecting from the outside face thereof, and of lesser diameter than the cutting edge of the disk, a scraper having its edge portion working on the projecting shoulder and its side portion working on the projecting face of the disk, and means for maintaining the scraper in contact with both of said faces.

THOMAS BRENNAN, Jr.

Witnesses:
L. C. BLANDING,
JAMES J. LAMB.

Copies of this patent may be obtained for five cents each, by addressing the "Commissioner of Patents, Washington, D. C."